Dec. 24, 1957    F. T. ROBERTS ET AL    2,817,130
HOSE CLAMP

Filed June 4, 1956     2 Sheets-Sheet 1

INVENTOR.
FRED T. ROBERTS
ROBERT E. ROBERTS
BY
ATTORNEY

Dec. 24, 1957   F. T. ROBERTS ET AL   2,817,130
HOSE CLAMP

Filed June 4, 1956   2 Sheets-Sheet 2

INVENTOR.
FRED T. ROBERTS
ROBERT E. ROBERTS
BY
J. Louis Wolk
ATTORNEY

United States Patent Office 2,817,130
Patented Dec. 24, 1957

2,817,130

HOSE CLAMP

Fred Thomas Roberts and Robert E. Roberts, Wilton, Conn.

Application June 4, 1956, Serial No. 589,229

11 Claims. (Cl. 24—27)

This invention relates to a hose clamp, and more specifically to a self-locking type of hose clamp for securing or attaching resilient hose to rigid tubing that is inserted therein.

Hose clamps of the type used heretofore have consisted of a single loop of flexible, yet rigid, metal wire with upstanding ends capable of being forced apart by means of special tools, held in this forced apart position while installing over a hose, then released to allow the clamp to seal the hose on the rigid tubing or piping around which the hose is placed. There are, however, a number of faults to be found with these devices, which it is the purpose of the present invention to remedy.

Primarily, the act of holding the ends of the clamp apart with a tool while maneuvering delicately to insert it over the desired hose clamp is fraught with peril to the fingers and temper of the hapless mechanic. It is inevitable that an incautious movement may cause the tool or the clamp to brush against an obstacle such as may be found in the vicinity of hose and tubes. This usually dislodges the grip of the tool upon the clamp and the procedure must be started afresh. Any mechanic would agree that it is infinitely desirable to lock the clamp in its open position. Coupled with this feature, the same mechanic has often indicated that such a clamp should be simple to release.

A second disadvantage of conventional clamps lies in the fact that pressure of the loop causes it to sink into the hose at least as far as the major diameter of the loop. This causes a weakening in the tension of the clamp because it no longer is at its optimum diameter; that is, the diameter which permits exertion of the maximum pressure. It is desirable that this condition be improved in order to maintain a true seal.

A third fault with the conventional clamp lies in the fact that it is possible to open the clamp too far and distort the material. At the very least, the elastic limit of the material may be exceeded and allow the closed diameter of the clamp to increase, thus reducing the clamping pressure below the sealing point. At the worst, the clamp may actually break. Safeguards against such an occurrence are necessary.

The above problems are solved as shown in our inventions by providing a plurality of loops instead of one and by providing a series of lateral notches in the loop. The first of the above problems, that is, locking the clamp in its open position, is solved by means of the notches in the clamp. These notches are capable of engaging each other to hold the clamp open until it is installed, then quickly being disengaged by the touch of a tool such as a screwdriver. The second problem is solved by the plural loop feature because the extra strength and rigidity thus imparted keep the clamp from sinking in as far as a single loop. At the same time, however, the sealing pressure on the hose is greater because of the additional contact surface, and because the flexible hose material is displaced between a plurality of loops instead of under a single loop. The third problem of excessive opening is solved by both of the above features, since the multiple loop structure increases the rigidity and the notches eliminate the need for exceeding a certain critical point.

It is the principal object of the invention, therefore, to provide a novel clamping device that is of simple construction.

It is a further object to provide a clamp with high strength characteristics.

It is an additional object to provide a clamp which is self-locking in the open position.

It is still another object to provide a clamp which may be unlocked again by simple means.

A further object is the provision of a clamping device that will remain at maximum sealing strength.

These and other objects will be readily apparent in the following description and drawings in which.

Figure 1:
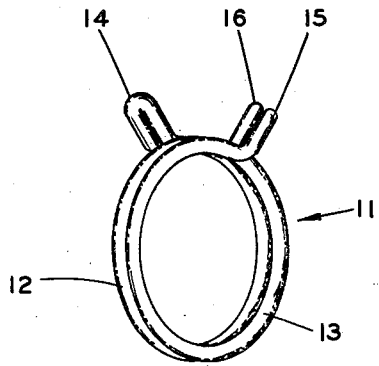
Figure 1 is a perspective view of the principal form of my invention.
Figure 2:
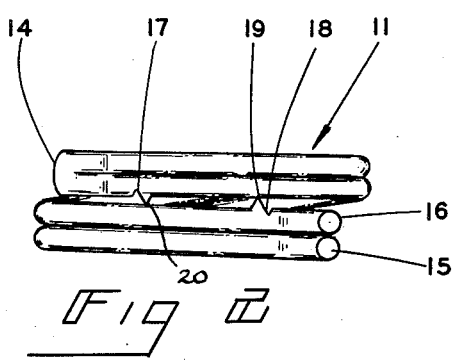
Figure 2 is a top view of the device of Figure 1, shown in closed position.
Figure 3:
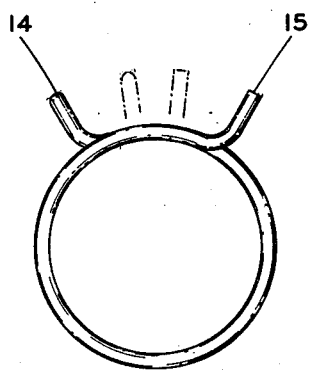
Figure 3 is a front view of the device of Figures 1 and 2.

Referring now to the principal form of the invention illustrated in Figures 1, 2, and 3, the novel clamp 11 consists essentially of a plurality of complete parallel loops 12 and 13 terminating in ends which extend radially outward from the center of said loops. Although only two loops are shown, any number of loops desired may be formed in the same way. These loops may be formed of one continuous piece of wire of round or rectangular cross-section, or by joining together separate loops by such conventional methods as spotwelding, welding, or brazing. One of the loops terminates in the end 14, while the other terminates in the end 15; each of these ends may be a closed loop if desired, such as illustrated by the end 14; or may be open such as illustrated by ends 15 and 16. The specific clamp shown, for example, might be made by a piece of wire of predetermined length which is bent in half to form a closed loop 14 at the bend and twisted into the double loop with the original ends of the wire forming the ends 15 and 16. If the clamp is to be made by forming two separate loops and fastening them, both ends would be open. As shown in Figure 2, a plurality of V-shaped notches 17 and 18 are formed in the loops at their upper portions. These notches are located at points which are close enough together to permit locking the clamp in open position, without permitting the clamps to pass the yield point in strength. The notches are located on the lateral surfaces of the loops nearest each other, and are formed by cutting into the metal sufficiently to form the female notched portions 17 and 18 in the loops and at the same time forcing the metal outward to form male portions 19 and 20 which project beyond the loops.

The clamps described herein in the respective figures are formed of steel or other metal having a desired degree of inherent springiness. The loops are so fabricated that the clamp will be in a normally closed or clamping position with the loops tending to assume a desired minimum diameter when the notches are disengaged.

When it is desired to open the clamp, an ordinary pair of pliers or other tool is used to squeeze the ends 15 and 16 toward end 14 until the notches 17 of each loop engage each other. The ends of the loops will then be in the position illustrated in phantom in Figure 3. The male portion 19 of each notch will engage the female portion 18 of the other notch and cause the clamp to remain locked in the open position. When it is desired to unlock the clamp, a screw driver or other tool is inserted between the loops and twisted slightly to disengage the notches and allow the clamp to return to its normal clamping position due to the inherent springiness of the loops of the clamp.

Figure 4:
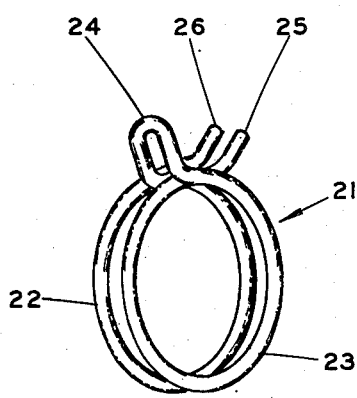
Figure 4 is a perspective view of a modification of the device of Figures 1, 2, and 3.
Figure 5:
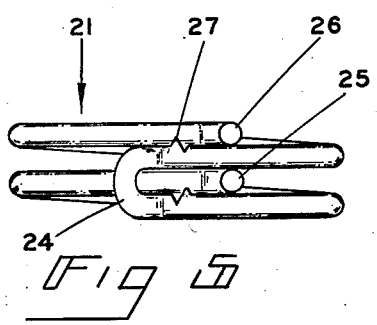
Figure 5 is a top view of the device of Figure 4 shown in open position.

In the modification of Figures 4 and 5, the basic principles of a multiple loop and engaging notches are also embodied. In this case the clamp 21 comprises the parallel loops 22 and 23, and terminate in a closed loop 24 and an open end which is formed of separate end pieces 25 and 26. This clamp may be made in a similar fashion to the principal form, either by forming a single length of wire or fastening a plurality of pieces. In this case, however, the end 25 is passed between the loops 22 and 23 and the closed loop end 24, while the end 26 is passed outside the loop 22. Thus the loops are spaced from each other by the diameter of the material of which each loop is formed over the major portion thereof. As shown in Figure 5, the notches 27 are located in the adjacent lateral surfaces of the loops, and are formed exactly like the notches 17 of the principal modification. The clamp may be locked in the Figure 5 position by bringing the ends 25 and 26 toward the end 24 until the notches engage as shown, and may be unlocked by a simple motion of a tool as described.

Figure 6:
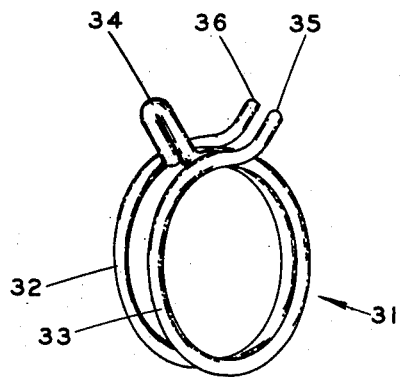
Figure 6 is a perspective view of a further modification of the invention.
Figure 7:
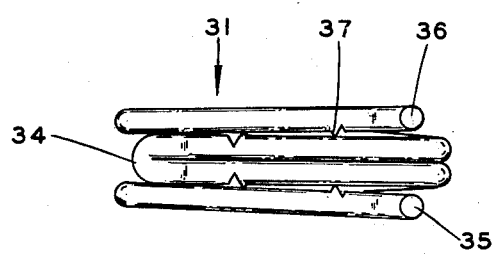
Figure 7 is a top view of the device of Figure 6 shown in closed position.

In the modification of Figures 6 and 7, the same basic principles are again disclosed. The clamp 31 consists of loops 32 and 33, but in this case the closed loop end 34 is passed between the loops and the ends 35 and 36. This clamp may also be made in a similar fashion to the other forms. The notches 37 are shown with the clamp in closed position, this time, in Figure 7. The notches are disengaged, but again a squeezing of ends 35 and 36 toward end 34 will bring the notches into engagement and hold the clamp in its open position until the desired disengagement as before.

Figure 9:
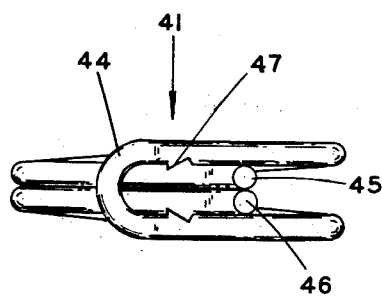
Figure 9 is a top view of the device of Figure 8 shown in open position.
Figure 8:
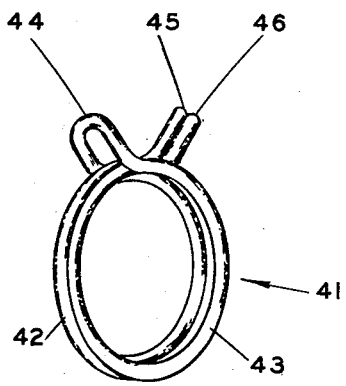
Figure 8 is a perspective view of still another modification of the invention.

The modification of Figures 8 and 9 is identical to the previous form of the invention in that the element 41 is formed of loops 42 and 43. However, in this case the ends 45 and 46 pass between the closed loop 44. The notches 47 are shown in engaged position (clamp open) in Figure 9, and the operation is identical to the above-described devices.

Thus it can be seen that by means of this invention, a clamp of great strength and rigidity, featuring consistency of locking in the open position, is provided. The combination of a multiple loop and the notches in the lateral adjacent surfaces of this loop result in this highly successful device that must rank as a major step forward in the clamp art.

It should be further noted that other modifications of this device may be made without departing from the spirit of the invention. We do not intend to be bound by the details and features shown.

What is claimed is:

1. A clamping device capable of opening and closing comprising a plurality of parallel loops and locking means located in the lateral adjacent surfaces of said loops, said locking means capable of interengagement when said clamp is in its open position.

2. A clamp comprising a length of springy material formed into a plurality of parallel loops, the lateral adjacent surfaces of said loops being provided with a plurality of notches, said notches so located with respect to each other that displacement of the clamp tending to increase the diameter of said loops causes engagement of said notches.

3. A clamp comprising a plurality of parallel loops, said loops imparting a springiness tending to keep said clamp in a closed position, and locking means in the lateral adjacent surfaces of said loops, said locking means so located with respect to each other that interengagement thereof overcomes the springiness sufficiently to lock the clamp in an open position.

4. The clamp of claim 3 in which said locking means are notches.

5. A clamping device for resilient hose and the like adapted to encircle and grip said hose in a closed position, comprising a length of springy material formed into a plurality of parallel loops and terminating in divergent ends extending radially outward, said loops imparting a springiness tending to keep said clamp in a closed position, and locking means in the lateral adjacent surfaces of said loops located near said ends and capable of interengagement when said ends are brought toward each other, said interengagement overcoming the springiness sufficiently to lock the clamp in an open position.

6. The clamp of claim 5 in which said locking means are notches.

7. A clamp consisting of a length of springy material folded against itself at the center in the form of a closed loop end, said material formed into a plurality of parallel loops with the closed loop end passing between the parallel loops and between the original ends of the material, said original ends parallel to each other and divergent from said closed loop end, said original ends and said closed loop end extending radially outward.

8. The clamp of claim 7 including locking means in the lateral adjacent surface of said loops, said locking means capable of interengagement when said original ends are brought toward said closed loop end.

9. A clamp consisting of a length of springy material folded against itself at the center to form a double length of material with a closed loop at one end and the original ends in contact to form a doubled end, said double length formed into a plurality of parallel loops, said closed loop end and said doubled end each extending radially outward, said closed loop end divergent from and on one side of said doubled end, and locking means incorporated in the lateral adjacent surfaces of said loops, said locking means capable of interengagement when said double end is brought toward said closed loop end.

10. A clamp consisting of a length of springy material folded at the center in the form of a loop end, said material formed into a plurality of parallel loops with one of the original ends of the material passing between said parallel loops, and the other of the original ends adjacent to one of said parallel loops, said ends being parallel to each other and divergent from said loop end, said original ends and said loop end extending radially outward, and locking means located in the lateral adjacent surfaces of said loops, said locking means capable of interengagement when said original ends are brought toward said loop end.

11. A clamp consisting of a length of springy material folded at the center in the form of a loop end and the original ends in contact to form a doubled end, said material formed into a plurality of parallel loops with said doubled end passing between said loops, said doubled end and said closed loop end divergent from each other and extending radially outward, and locking means provied in the lateral adjacent surfaces of said loops, said locking means capable of interengagement when said doubled end and said closed loop end are brought toward each other.

References Cited in the file of this patent

UNITED STATES PATENTS

| 461,407 | Ellis | Oct. 13, 1891 |
| 973,532 | McLaughlin | Oct. 25, 1910 |
| 2,629,908 | Keck | Mar. 3, 1953 |

FOREIGN PATENTS

| 173,134 | Switzerland | Feb. 1, 1935 |
| 461,048 | Great Britain | Feb. 9, 1937 |
| 492,541 | Italy | Mar. 27, 1954 |
| 1,055,329 | France | Oct. 14, 1953 |